United States Patent
Dubois et al.

(10) Patent No.: US 11,362,368 B2
(45) Date of Patent: Jun. 14, 2022

(54) NONAQUEOUS ELECTROLYTE COMPOSITIONS

(71) Applicant: Solvay SA, Brussels (BE)

(72) Inventors: Charles J. Dubois, Orange, TX (US); George K. Kodokian, Kennet Square, PA (US)

(73) Assignee: Solvay SA, Brussels (BE)

( * ) Notice: Subject to any disclaimer, the term of this patent is extended or adjusted under 35 U.S.C. 154(b) by 181 days.

(21) Appl. No.: 16/118,034

(22) Filed: Aug. 30, 2018

(65) Prior Publication Data

US 2018/0375159 A1 Dec. 27, 2018

Related U.S. Application Data

(62) Division of application No. 14/792,932, filed on Jul. 7, 2015, now abandoned.

(51) Int. Cl.
| | |
|---|---|
| *H01M 10/0567* | (2010.01) |
| *H01M 10/0569* | (2010.01) |
| *H01M 10/0525* | (2010.01) |
| *H01M 4/505* | (2010.01) |
| *H01M 4/525* | (2010.01) |
| *H01M 4/485* | (2010.01) |
| *H01M 4/583* | (2010.01) |

(52) U.S. Cl.
CPC ....... *H01M 10/0567* (2013.01); *H01M 4/485* (2013.01); *H01M 4/505* (2013.01); *H01M 4/525* (2013.01); *H01M 4/583* (2013.01); *H01M 10/0525* (2013.01); *H01M 10/0569* (2013.01); *H01M 2300/004* (2013.01); *H01M 2300/0034* (2013.01); *H01M 2300/0037* (2013.01)

(58) Field of Classification Search
CPC ......... H01M 10/0567; H01M 10/0569; H01M 10/0525; H01M 4/505; H01M 4/485; H01M 4/525; H01M 4/583; H01M 2300/0037

See application file for complete search history.

(56) References Cited

U.S. PATENT DOCUMENTS

| | | | | |
|---|---|---|---|---|
| 2008/0292971 | A1* | 11/2008 | Ihara | H01M 10/0569 429/331 |
| 2014/0302402 | A1* | 10/2014 | Chen | H01M 10/0567 429/333 |
| 2015/0140444 | A1* | 5/2015 | Dubois | H01M 10/0567 429/331 |

* cited by examiner

*Primary Examiner* — Laura Weiner

(74) *Attorney, Agent, or Firm* — Osha Bergman Watanabe & Burton LLP

(57) ABSTRACT

Electrolyte compositions containing a solvent, a co-solvent, certain cyclic carboxylic acid anhydride additives, certain phosphorus-containing additives, and an electrolyte salt are described. The electrolyte compositions are useful in electrochemical cells, such as lithium ion batteries where they provide significantly improved cycle life with no loss of discharge capacity.

12 Claims, No Drawings

NONAQUEOUS ELECTROLYTE COMPOSITIONS

CROSS-REFERENCE TO RELATED APPLICATIONS

The present application is a divisional filed pursuant to 35 U.S.C. § 121 of U.S. patent application Ser. No. 14/792,932, filed on Jul. 7, 2015, which is now abandoned, the whole content of this application being herein incorporated by reference for all purpose.

TECHNICAL FIELD

The disclosure herein relates to electrolyte compositions containing a solvent, a co-solvent, certain cyclic carboxylic acid anhydride additives, certain phosphorus-containing additives, and an electrolyte salt, which are useful in electrochemical cells, such as lithium ion batteries.

BACKGROUND

Carbonate compounds are currently used as electrolyte solvents for non-aqueous batteries containing electrodes made from alkali metals, alkaline earth metals, or compounds comprising these metals, for example lithium ion batteries. Current lithium ion battery electrolyte solvents typically contain one or more linear carbonates, such as ethyl methyl carbonate, dimethyl carbonate, or diethylcarbonate; and a cyclic carbonate, such as ethylene carbonate. However, at cathode potentials above 4.4 V these electrolyte solvents can decompose, which can result in a loss of battery performance. Additionally, there are safety concerns with the use of these electrolyte solvents because of their low boiling point and high flammability.

Various approaches have been investigated to overcome the limitations of commonly used non-aqueous electrolyte solvents. For example, additives, such as cyclic carboxylic acid anhydrides, have been used in combination with the currently used electrolyte solvents (see, for example, Jean et al. U.S. Patent Application Publication No. 2010/0273064 A1). Various fluorinated carboxylic acid ester electrolyte solvents have also been investigated for use in lithium ion batteries (see, for example, Nakamura et al in JP 4/328,915-B2, JP 3/444,607-B2, and U.S. Pat. No. 8,097,368). Additionally, Xu et al. (U.S. Patent Application Publication No. 2012/0009485 A1) describes a series of phosphorus compounds and boron compounds that can be used as co-solvents, solutes, or additives in non-aqueous electrolytes for use with 5 V class cathodes in lithium ion batteries.

Despite the efforts in the art as described above, a need remains for electrolyte compositions that will have improved cycling performance at high temperature when used in a lithium ion battery, particularly such a battery that operates at high voltage (i.e. up to about 5 V).

SUMMARY

In one embodiment, there is provided herein an electrolyte composition to comprising:
a) at least one solvent;
b) at least one co-solvent;
c) at least one cyclic carboxylic acid anhydride selected from the group consisting of

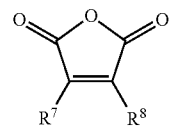 I

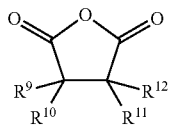 II

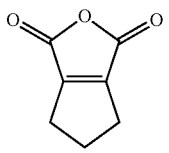 III

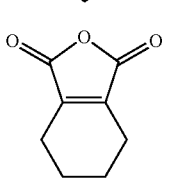 IV

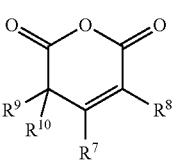 V

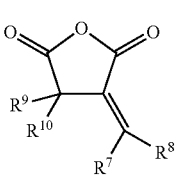 VI

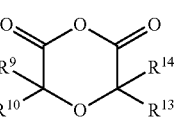 VII

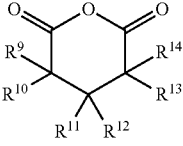 VIII where $R^7$ to $R^{14}$ are independently H, F, C1 to C10 alkyl optionally substituted with fluorine, alkoxy, and/or thioalkyl, C2 to C10 alkene, or C6 to C10 aryl;
d) at least one phosphorus-containing additive selected from the group consisting of organic phosphates, organic phosphonates, and partial salts thereof; and
e) at least one electrolyte salt.

In another embodiment, there is provided herein an electrochemical cell comprising:
(a) a housing;
(b) an anode and a cathode disposed in said housing and in ionically conductive contact with one another;
(c) the electrolyte composition disclosed herein, disposed in said housing and providing an ionically conductive pathway between said anode and said cathode; and
(d) a porous separator between said anode and said cathode.

In one embodiment, the electrochemical cell is a lithium ion battery.

In another embodiment, there is provided herein an electronic device comprising an electrochemical cell as disclosed herein.

DETAILED DESCRIPTION

As used above and throughout the disclosure, the following terms, unless otherwise indicated, shall be defined as follows:

The term "electrolyte composition" as used herein, refers to a chemical composition suitable for use as an electrolyte in an electrochemical cell.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

The term "anode" refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharge and reduction occurs during charging.

The term "cathode" refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge, and from the cathode to the anode during charge.

Disclosed herein are electrolyte compositions comprising at least one solvent, at least one co-solvent, at least one cyclic carboxylic acid anhydride additive, at least one phosphorus-containing additive, and an electrolyte salt. The electrolyte compositions are useful in electrochemical cells, particularly lithium ion batteries, where they provide significantly improved cycle life with no loss of discharge capacity.

In the electrolyte compositions disclosed herein, the solvent can be a fluorinated solvent, a non-fluorinated solvent, or a mixture thereof. Suitable non-fluorinated solvents include without limitation, ethyl methyl carbonate (EMC), dimethyl carbonate (DMC), diethyl carbonate (DEC), propylene carbonate, and mixtures thereof. These solvents are available commercially from companies such as Novolyte (Independence, Ohio).

Fluorinated solvents can be selected from fluorinated acyclic carboxylic acid esters, fluorinated acyclic carbonates, and fluorinated acyclic ethers. Suitable fluorinated acyclic carboxylic acid esters are represented by the formula $R^1$—COO—$R^2$, where $R^1$ and $R^2$ independently represent an alkyl group, the sum of carbon atoms in $R^1$ and $R^2$ is 2 to 7, at least two hydrogens in $R^1$ and/or $R^2$ are replaced by fluorines and neither $R^1$ nor $R^2$ contains a —$CH_2F$ or —CHF— group. The presence of a monofluoroalkyl group (i.e. —$CH_2F$ or —CHF—) in the carboxylic acid ester may cause toxicity. Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), and $HCF_2$—CH2—CH2—COO—$CH_2CH_3$ (ethyl 4,4-difluorobutanoate, CAS No. 1240725-43-2). In one embodiment, the fluorinated acyclic carboxylic acid ester is 2,2-difluoroethyl acetate ($CH_3$—COO—$CH_2CF_2H$), or 2,2-difluoroethyl propionate ($CH_3CH_2$—COO—$CH_2CF_2H$), or a mixture thereof.

Suitable fluorinated acyclic carbonates are represented by the formula $R^3$—OCOO—$R^4$, where $R^3$ and $R^4$ independently represent an alkyl group, the sum of carbon atoms in $R^3$ and $R^4$ is 2 to 7, at least two hydrogens in $R^3$ and/or $R^4$ are replaced by fluorines and neither $R^3$ nor $R^4$ contains a —$CH_2F$ or —CHF— group. Examples of suitable fluorinated acyclic carbonates include without limitation $CH_3$—OC(O)O—$CH_2CF_2H$ (methyl 2,2-difluoroethyl carbonate, CAS No. 916678-13-2), $CH_3$—OC(O)O—$CH_2CF_3$ (methyl 2,2,2-trifluoroethyl carbonate, CAS No. 156783-95-8), $CH_3$—OC(O)O—$CH_2CF_2CF_2H$ (methyl 2,2,3,3-tetrafluoropropyl carbonate, CAS No.156783-98-1), $HCF_2CH_2$—OCOO—$CH_2CH_3$ (ethyl 2,2-difluoroethyl carbonate, CAS No. 916678-14-3), and $CF_3CH_2$—OCOO—$CH_2CH_3$ (ethyl 2,2,2-trifluoroethyl carbonate, CAS No. 156783-96-9).

Suitable fluorinated acyclic ethers are represented by the formula: $R^5$—O—$R^6$, where $R^5$ and $R^6$ independently represent an alkyl group, the sum of carbon atoms in $R^5$ and $R^6$ is 2 to 7, at least two hydrogens in $R^5$ and/or $R^6$ are replaced by fluorines and neither $R^6$ nor $R^6$ contains a —$CH_2F$ or —CHF— group. Examples of suitable fluorinated acyclic ethers include without limitation $HCF_2CF_2CH_2$—O—$CF_2CF_2H$ (CAS No. 16627-68-2) and $HCF_2CH_2$—O—$CF_2CF_2H$ (CAS No. 50807-77-7).

A mixture of two or more of these fluorinated acyclic carboxylic acid ester, fluorinated acyclic carbonate, and/or fluorinated acyclic ether solvents can also be used. In one embodiment, the electrolyte composition comprises 2,2-difluoroethyl acetate or 2,2-difluoroethyl propionate, or a mixture thereof, Fluorinated acyclic carboxylic acid esters, fluorinated acyclic carbonates, and fluorinated acyclic ethers suitable for use herein can be prepared using known methods. For example, acetyl chloride can be reacted with 2,2-difluoroethanol (with or without a basic catalyst) to form 2,2-difluoroethyl acetate. Additionally, 2,2-difluoroethyl acetate and 2,2-difluoroethyl propionate can be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate can be reacted with 2,2-difluoroethanol to form methyl 2,2-difluoroethyl carbonate. Synthesis of $HCF_2CF_2CH_2$—O—$CF_2CF_2H$ can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields $HCF_2CH_2$—O—$CF_2CF_2H$. Alternatively, some of these fluorinated solvents may be purchased from companies such as Matrix Scientific (Columbia S.C.). For best results, it is desirable to purify the fluorinated acyclic carboxylic esters, fluorinated acyclic carbonates, and fluorinated acyclic ethers to a purity level of at least about 99.9%, more particularly at least about 99.99%. These fluorinated solvents can be purified using methods known in the art, such as solvent extraction, column chromatography, or distillation methods including vacuum distillation or spinning band distillation.

In the electrolyte compositions disclosed herein, the solvent or mixtures thereof can be used in various amounts depending on the desired properties of the electrolyte composition. In one embodiment, the solvent is used in an amount of about 5% to about 95% by weight of the electrolyte composition. In another embodiment, the solvent is used in an amount of about 10% to about 80% by weight of the electrolyte composition. In another embodiment, the solvent is used in an amount of about 30% to about 70% by weight of the electrolyte composition. In another embodiment, the solvent is used in an amount of about 45% to about 65% by weight of the electrolyte composition. In another embodiment, the solvent is used in an amount of about 6% to about 30% by weight of the electrolyte composition. In another embodiment, the solvent is used in an amount of about 61% by weight of the electrolyte composition.

The electrolyte compositions disclosed herein also comprise at least one co-solvent. Examples of suitable co-solvents include without limitation one or more carbonates or sulfones. Suitable carbonates include without limitation ethyl methyl carbonate, dimethyl carbonate, diethyl carbonate, butylene carbonate, or ethylene carbonate. A non-limiting example of a sulfone co-solvent is ethyl methyl sulfone. Mixtures of two or more of these co-solvents can also be used. In one embodiment, the co-solvent is ethylene carbonate. It is desirable to use a co-solvent that is battery grade or has a purity level of at least about 99.9%, and more particularly at least about 99.99%. Many of these co-solvents are available commercially from companies such as Novolyte, (Independence, Ohio).

In the electrolyte compositions disclosed herein, the co-solvent or mixtures thereof can be used in various amounts depending on the desired properties of the electrolyte composition. In one embodiment, the co-solvent is used in an amount of about 0.1% to about 80% by weight of the electrolyte composition. In another embodiment, the co-solvent is used in an amount of about 0.1% to about 60% by weight of the electrolyte composition. In another embodiment, the co-solvent is used in an amount of about 10% to about 50% by weight of the electrolyte composition. In another embodiment, the co-solvent is used in an amount of about 20% to about 40% by weight of the electrolyte composition. In another embodiment, the co-solvent is used in an amount of about 20% to about 30% by weight of the electrolyte composition. In another embodiment, the co-solvent is used in an amount of about 25% by weight of the electrolyte composition.

In one embodiment, the electrolyte composition comprises at least one fluorinated acyclic carboxylic acid ester and ethylene carbonate. In another embodiment, the electrolyte composition comprises 2,2-difluoroethyl acetate or 2,2-difluoroethyl propionate, or a mixture thereof, and ethylene carbonate.

The electrolyte compositions disclosed herein further comprise at least one cyclic carboxylic acid anhydride. Suitable cyclic carboxylic acid anhydrides are represented by the following formulae:

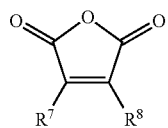

I

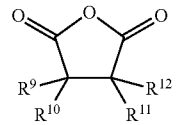

II

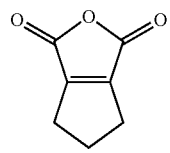

III

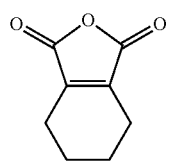

IV

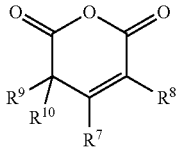

V

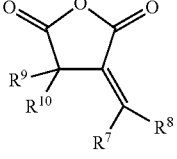

VI

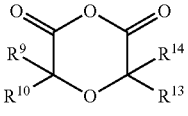

VII

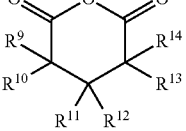

VIII wherein $R^7$ to $R^{14}$ are independently H, F, $C_1$ to $C_{10}$ alkyl optionally substituted with fluorine, alkoxy, and/or thioalkyl, $C_2$ to $C_{10}$ alkene, or $C_6$ to $C_{10}$ aryl. Examples of suitable cyclic carboxylic acid anhydrides include without limitation maleic anhydride, succinic anhydride, glutaric anhydride, 2,3-dimethylmaleic anhydride, citraconic anhydride, 1-cyclopentene-1,2-dicarboxylic anhydride, 2,3-diphenylmaleic anhydride, 3,4,5,6-tetrahydrophthalic anhydride, 2,3-dihydro-1,4-dithiiono-[2,3-c] furan-5,7 dione, and phenylmaleic anhydride. A mixture of two or more of these cyclic carboxylic acid anhydrides can also be used. In one embodiment, the cyclic carboxylic acid anhydride is maleic anhydride. These materials can be obtained from a specialty chemical company such as Sigma-Aldrich, Inc. (Milwaukee, Wis.). It is desirable to purify the cyclic carboxylic acid anhydride to a purity level of at least about 99.0%, more particularly at least about 99.9%. Purification can be done using known methods, as described above.

The cyclic carboxylic acid anhydride or a mixture thereof is generally used in the electrolyte composition in an amount of about 0.01% to about 40%, more particularly, about 0.05% to about 20%, more particularly about 0.1% to about 30%, more particularly about 0.1% to about 20%, more particularly about 0.1% to about 10%, more particularly about 0.5% to about 5% and more particularly about 0.7% to about 2% by weight of the total electrolyte composition. In one embodiment, the cyclic carboxylic acid anhydride is used in the electrolyte composition at about 1% by weight.

The electrolyte compositions disclosed herein further comprises at least one phosphorus-containing additive selected from organic phosphates, organic phosphonates, and partial salts thereof.

Suitable organic phosphate additives include without limitation organic phosphates represented by the formula:

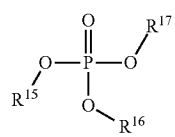

(1)

wherein $R^{15}$, $R^{16}$, and $R^{17}$ are each independently linear or branched $C_1$ to $C_{10}$ alkyl or fluoroalkyl, $C_3$ to $C_{10}$ cyclic alkyl, $C_2$ to $C_{10}$ ether, $C_2$ to $C_{10}$ ether wherein at least one of the hydrogens is replaced with a fluorine, $R^{15}$ and $R^{16}$, $R^{16}$ and $R^{17}$, or $R^{15}$ and $R^{17}$ may be joined to form a ring. The term "fluoroalkyl", as used herein, refers to a linear or branched alkyl group wherein one or more hydrogens have been replaced with one or more fluorines. Suitable examples of organic phosphate additives include without limitation tris(1,1,1,3,3,3-hexafluoropropan-2yl) phosphate (CAS No. 66489-68-7), tris(2,2,2-trifluoroethyl) phosphate (CAS No. 358-63-4), tri(2,2,3,3,3-pentafluoropropyl) phosphate (CAS No. 25476-41-9), tris(2,2,3,3-tetrafluoropropyl) phosphate (CAS No. 563-10-0), triethyl phosphate (CAS No. 78-40-0), trimethyl phosphate (CAS No. 512-56-1), tripropyl phosphate (CAS No. 513-08-6), triisopropyl phosphate (CAS No. 513-02-0), tris(2,2,3,3,4,4,5,5,6,6-decafluorohexyl) phosphate, and tris(2,2-difluoroethyl) phosphate (CAS No. 358-64-5).

Partial salts of organic phosphates include without limitation compounds represented by the following formulae,

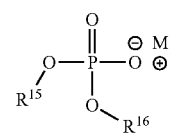

(2)

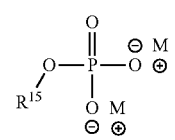

(3)

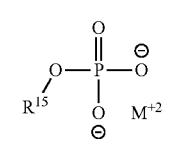

(4)

wherein $R^{15}$ and $R^{16}$ are defined as above, $R^{15}$ and $R^{16}$ may be joined to form a ring, $M^+$ is a Group I cation selected from lithium, sodium, potassium, rubidium, or cesium, and $M^{+2}$ is a Group II cation selected from beryllium, magnesium, calcium, strontium, or barium. In one embodiment, $M^+$ is lithium, sodium, or potassium. In another embodiment, $M^+$ is lithium. In one embodiment, $M^{+2}$ is calcium or magnesium.

Suitable organic phosphonate additives include without limitation organic phosphonates represented by the formula:

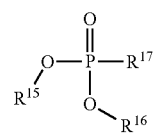

(5)

wherein $R^{15}$, $R^{16}$, and $R^{17}$ are defined as above, $R^{15}$ and $R^{16}$, $R^{16}$ and $R^{17}$, or $R^{15}$ and $R^{17}$ may be joined to form a ring. A non-limiting example of an organic phosphonate additive is dimethylmethylphosphonate.

Partial salts of organic phosphonates include without limitation compounds represented by the following formulae:

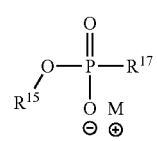

(6)

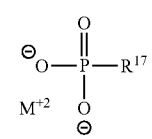

(7)

wherein $R^{15}$ and $R^{17}$ are defined as above, $R^{15}$ and $R^{17}$ may be joined to form a ring, and $M^+$ and $M^{+2}$ are defined as above.

Phosphorus-containing additives can be obtained from commercial sources such as Sigma-Aldrich (Milwaukee, Wis.). The phosphorus-containing additives can also be prepared using methods known in the art. For example, organic phosphate additives can be prepared by the method described by A. von Cresce et al. (*Journal of the Electrochemical Society*, No. 158, p. A337, 2011), using the reaction of phosphorus oxychloride with the corresponding fluorinated alcohol in the presence of lithium hydride in diethyl ether. Organic phosphate additives can also be prepared using the procedure described by L. Zaharov et al., (*Izvestiya Akademii Nausk USSR, Seriya Khimicheskaya*, No. 8, p.1860, 1969) and I. Kudryvtsev et al. (*Izvestiya Akademii Nausk USSR, Seriya Khimicheskaya*, No. 11, pp. 2535-2540, 1982), using the reaction of phosphorus oxychloride with the corresponding fluorinated alcohol in the presence of LiCl catalyst in the absence of a solvent. A Lewis acid-mediated Michaelis-Arbuzov reaction of arylmethyl halides and alcohols with triethyl phosphite at room temperature can be used to prepare arylmethyl and heteroarylmethyl phosphonate esters in good yields as described by G. G. Rajeshwaran et al. (*Org. Lett.*, 2011, 13, 1270-1273). The phosphorus-containing additives can be purified using methods known in the art, as described above.

The phosphorus-containing additive or a mixture thereof, is generally used in an amount of about 0.2% to about 10% by weight of the total electrolyte composition. In another embodiment, the phosphorus-containing additive is used in an amount of about 0.5% to about 5% by weight of the total electrolyte composition. In another embodiment, the phosphorus-containing additive is used in an amount of about 0.5% to about 2% by weight of the total electrolyte composition. In another embodiment, the phosphorus-containing additive is used in an amount of about 0.5% to about 1.5% by weight of the total electrolyte composition. In another embodiment, the phosphorus-containing additive is used in an amount of about 1% by weight of the total electrolyte composition.

The electrolyte compositions disclosed herein may optionally further contain additives such as lithium bis (oxalato)borate, fluoroethylene carbonate (also referred to herein as FEC or 4-fluoro-1,3-dioxolan-2-one, CAS No. 114435-02-8), FEC derivatives, including 4,5-difluoro-1,3-doxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one, and ethylene carbonates substituted with at least one of a saturated or unsaturated $C_1$ to $C_4$ fluoroalkyl group, or mixtures thereof. In one embodiment, the additive is selected from the group consisting of lithium bis(oxalato)borate and fluoroethylene carbonate. The additive, if used, is generally present in the electrolyte composition in an amount of about 0.01% to about 10%, more particularly, about 0,05% to about 10%, more particularly about 0.1% to about 10%, more particularly about 0.1% to about 5.0%, more particularly about 0.25% to about 5.0%, more particularly about 0.25% to about 3.0%, and more particularly about 0.25% to about 1.5% by weight of the total electrolyte composition.

In one embodiment, the electrolyte composition comprises a nonfluorinated linear carbonate, ethylene carbonate, an organic phosphate additive or organic phosphonate additive, maleic anhydride, and to fluoroethylene carbonate. In another embodiment, the electrolyte composition comprises ethyl methyl carbonate, ethylene carbonate, triethyl phosphate, maleic anhydride, and fluoroethylene carbonate. In another embodiment, the electrolyte composition comprises about 58% to about 65% ethyl methyl carbonate, about 23% to about 26% ethylene carbonate, about 0.25% to about 3.0% triethyl phosphate, about 0.25% to about 3.0% maleic anhydride, and about 0.25% to about 3.0% fluoroethylene carbonate, by weight of the total electrolyte composition.

In another embodiment, the electrolyte composition comprises a fluorinated acyclic carboxylic acid ester, ethylene carbonate, an organic phosphate or organic phosphonate additive, maleic anhydride, and fluoroethylene carbonate. In another embodiment, the electrolyte composition comprises 2,2-difluoroethey acetate, ethylene carbonate, triethyl phosphate, maleic anhydride, and fluoroethylene carbonate. In another embodiment, the electrolyte composition comprises about 58% to about 65% 2,2-difluoroethey acetate, about 23% to about 26% ethylene carbonate, about 0.25% to about 3.0% triethyl phosphate, about 0.25% to about 3.0% maleic anhydride, and about 0.25% to about 3.0% fluoroethylene carbonate, by weight of the total electrolyte composition.

The electrolyte compositions disclosed herein also contain at least one electrolyte salt. Suitable electrolyte salts include without limitation lithium hexafluorophosphate ($LiPF_6$),
lithium tris(pentafluoroethyl)trifluorophosphate ($LiPF_3(C_2F_5)_3$),
lithium bis(trifluoromethanesulfonyl)imide,
lithium bis(perfluoroethanesulfonyl)imide,
lithium (fluorosulfonyl) (nonafluorobutanesulfonyl)imide,
lithium bis(fluorosulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
lithium bis(oxalato)borate,
lithium difluoro(oxalato)borate,
$Li_2B_{12}F_{12-x}H_x$ where x is equal to 0 to 8, and
mixtures of lithium fluoride and anion receptors such as $B(OC_6F_5)_3$.

Mixtures of two or more of these or comparable electrolyte salts may also be used. In one embodiment, the electrolyte salt is lithium hexafluorophosphate. The electrolyte salt can be used in the electrolyte composition in an amount of about 0.2 to about 2.0 M, more particularly about 0.3 to about 1.5 M, and more particularly about 0.5 to about 1.2 M.

In another embodiment, there is provided herein an electrochemical cell comprising a housing, an anode and a cathode disposed in the housing and in ionically conductive contact with one another, an electrolyte composition, as described above, providing an ionically conductive pathway between the anode and the cathode, and a porous or microporous separator between the anode and the cathode. The housing may be any suitable container to house the electrochemical cell components. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, or a combination thereof. The pore size of the porous separator is sufficiently large to permit transport of ions, but small enough to prevent contact of the anode and cathode either directly or from particle in penetration or dendrites which can from on the anode and cathode.

In another embodiment, the electrochemical cell is a lithium ion battery. Suitable cathode materials for a lithium ion battery include without limitation electroactive transition metal oxides comprising lithium, such as $LiCoO_2$, $LiNiO_2$, $LiMn_2O_4$, or $LiV_3O_8$; oxides of layered structure such as $LiNi_xMn_yCo_zO_2$ where x+y+z is about 1, $LiCo_{0.2}Ni_{0.2}O_2$, $Li_{1+z}Ni_{1-x-y}Co_xAl_yO_2$ where 0<x<0.3, 0<y<0.1, and 0<z<0.06, $LiFePO_4$, $LiMnPO_4$, $LiCoPO_4$, $LiNi_{0.5}Mn_{1.5}O_4$, $LiVPO_4F$; mixed metal oxides of cobalt, manganese, and nickel such as those described in U.S. Pat. No. 6,964,828 (Lu) and U.S. Pat. No. 7,078,128 (Lu); nanocomposite cathode compositions such as those described in U.S. Pat. No. 6,680,145 (Obrovac); lithium-rich layered-layered composite cathodes such as those described in U.S. Pat. No. 7,468,223; and cathodes such as those described in U.S. Pat. No. 7,718,319 and the references therein.

In another embodiment, the cathode in the lithium ion battery disclosed herein comprises a cathode active material exhibiting greater than 30 mAh/g capacity in the potential range greater than 4.6 V versus a Li/Li$^+$ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula Li$_x$Ni$_y$M$_z$Mn$_{2-y-z}$O$_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode in the lithium ion battery disclosed herein comprises a cathode active material which is charged to a potential greater than or equal to 4.35 V versus a Li/Li$^+$ reference electrode. Examples of such cathodes are layered oxides such as LiCoO$_2$ or LiNi$_x$Mn$_y$Co$_z$O$_2$ where x+y+z is about 1, charged to cathode potentials higher than the standard 4.1 to 4.25 V range in order to access higher capacity. Other examples are layered-layered high-capacity oxygen-release cathodes such as those described in U.S. Pat. No. 7,468,223 charged to upper charging voltages above 4.5 V.

A cathode active material suitable for use herein can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of LiOH.H$_2$O at about 800 to about 950° C. in oxygen for 3 to 24 hours, as described in detail in the Examples herein. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

A lithium ion battery as disclosed herein further contains an anode, which comprises an anode active material that is capable of storing and releasing lithium ions. Examples of suitable anode active materials include without limitation lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, MnP$_4$ and CoP$_3$; metal oxides such as SnO$_2$, SnO and TiO$_2$; nanocomposites containing antimony or tin, for example nanocopmposites containing antimony, oxides of aluminum, titanium, or molybdenum, and carbon, such as those described by Yoon et al (*Chem. Mater.* 21, 3898-3904, 2009); and lithium titanates such as Li$_4$Ti$_5$O$_{12}$ and LiTi$_2$O$_4$. In one embodiment, the anode active material is lithium titanate or graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi NEI Inc. (Somerset, N.J.), and Farasis Energy Inc. (Hayward, Calif.).

A lithium ion battery as disclosed herein also contains a porous separator between the anode and cathode. The porous separator serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can from on the anode and cathode. Examples of porous separators suitable for use herein are disclosed in U.S. application Ser. No. 12/963,927 (filed 9 Dec. 2010, U.S. Patent Application Publication No. 2012/0149852, now U.S. Pat. No. 8,518,525), which is by this reference incorporated in its entirety as a part hereof for all purposes.

The housing of the lithium ion battery hereof may be any suitable container to house the lithium ion battery components described above. Such a container may be fabricated in the shape of small or large cylinder, a prismatic case or a pouch.

The lithium ion battery disclosed herein may be used for grid storage or as a power source in various electronically-powered or -assisted devices ("Electronic Device") such as a transportation device (including a motor vehicle, automobile, truck, bus or airplane), a computer, a telecommunications device, a camera, a radio or a power tool.

EXAMPLES

The subject matter disclosed herein is further defined in the following examples. It should be understood that these examples, while indicating preferred embodiments, are given by way of illustration only, and should not be interpreted to exclude from the scope of the appended claims, and the equivalents thereof, subject matter that is not described in these examples.

The meaning of abbreviations used is as follows: "g" means gram(s), "mg" means milligram(s), "pg" means microgram(s), "L" means liter(s), "mL" means milliliter(s), "mol" means mole(s), "mmol" means millimole(s), "M" means molar concentration, "wt %" means percent by weight, "mm" means millimeter(s), "ppm" means parts per million, "h" means hour(s), "min" means minute(s), "A" means amperes, "mA" mean milliampere(s), "mAh/g" mean milliamperes hour(s) per gram, "V" means volt(s), "xC" refers to a constant current which is the product of x and a current in A which is numerically equal to the nominal capacity of the battery expressed in Ah, "rpm" means revolutions per minute, "NMR" means nuclear magnetic resonance spectroscopy, "GC/MS" means gas chromatography/mass spectrometry.

Materials and Methods
Preparation of 2,2-Difluoroethyl Acetate

The 2,2-difluoroethyl acetate used in the following Examples was prepared by reacting potassium acetate with $HCF_2CH_2Br$. The following is a typical procedure used for the preparation.

Potassium acetate (Aldrich, Milwaukee, Wis., 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (-78° C., dry-ice/acetone). The reaction product was to transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent19091S-433, 30.m, 250 µm, 0.25 µm; carrier gas—He, flow rate 1 ml/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3 A molecular sieves, until water was not detectable by Karl Fischer titration (i.e., <1 ppm).

Preparation of $LiMn_{1.5}Ni_{0.45}Fe_{0.05}O_4$ Cathode Active Material

The following is a typical procedure used to prepare $LiMn_{1.5}Ni_{0.45}Fe_{0.05}O_4$ cathode active material. For the preparation, 401 g manganese (II) acetate tetrahydrate (Aldrich, Milwaukee Wis., Product No. 63537), 125 g nickel (II) acetate tetrahydrate (Aldrich, Product No. 72225) and 10 g iron (11) acetate anhydrous (Alfa Aesar, Ward Hill, Mass., Product No. 31140) were weighed into bottles on a balance, then dissolved in 5.0 L of deionized water. KOH pellets were dissolved in 10 L of deionized water to produce a 3.0 M solution inside a 30 L reactor. The solution containing the metal acetates was transferred to an addition funnel and dripped into the rapidly stirred reactor to precipitate the mixed hydroxide material. Once all 5.0 L of the metal acetate solution was added to the reactor, stirring was continued for 1 h. Then, stirring was stopped and the precipitate was allowed to settle overnight. After settling, the liquid was removed from the reactor and 15 L of fresh deionized water was added. The contents of the reactor were stirred, allowed to settle again, and the liquid was removed. This rinse process was repeated. Then, the precipitate was transferred to two (split evenly) coarse glass frit filtration funnels covered with Dacron® paper. The solids were rinsed with deionized water until the filtrate pH reached 6.0 (pH of deionized rinse water), and a further 20 L of deionized water was added to each filter cake. Finally, the cakes were dried in a vacuum oven at 120° C. overnight. The yield at this point was typically 80-90%.

The hydroxide precipitate was ground and mixed with lithium carbonate. This step was done in 50 g batches using a Pulverisette automated mortar and pestle (FRITSCH, Germany). For each batch the hydroxide precipitate was weighed, then ground alone for 5 min in the Pulveresette. Then, a stoichiometric amount with small excess of lithium carbonate was added to the system. For 50 g of hydroxide precipitate, 10.5 g of lithium carbonate was added. Grinding was continued for a total of 60 min with stops every 10-15 min to scrape the material off the surfaces of the mortar and pestle with a sharp metal spatula. If humidity caused the material to form clumps, it was sieved through a 40 mesh screen once during grinding, then again following grinding.

The ground material was fired in an air box furnace inside shallow rectangular alumina trays. The trays were 158 mm by 69 mrn in size, and each held about 60 g of material. The firing procedure consisted of ramping from room temperature to 900° C. in 15 h, holding at 900° C. for 12 h, then cooling to room temperature in 15 h.

After firing, the powder was ball-milled to reduce particle size. Then, 54 g of powder was mixed with 54 g of isopropyl alcohol and 160 g of 5 mm diameter zirconia beads inside a polyethylene jar. The jar was then rotated on a pair of rollers for 6 h to mill. The slurry was separated by centrifugation, and the powder was dried at 120° C. to remove moisture.

Cathode Preparation

The following is a typical procedure used to prepare cathodes. The binder was obtained as a 12% solution of polyvinylidene fluoride in NMP (N-methylpyrrolidone, KFL No. 1120, Kureha America Corp. New York, N.Y.). The following materials were used to make an electrode paste: 4.16 g $LiMn_{1.5}Ni_{0.45}Fe_{0.05}O_4$ cathode active powder as prepared above; 0.52 g carbon black (Denka uncompressed, DENKA Corp., Japan); 4.32 g PVDF (polyvinylidene difluoride) solution; and 7.76 g+1.40 g NMP (Sigma Aldrich). The materials were combined in a ratio of 80:10:10, cathode active powder:PVDF:carbon black, as described below. The final paste contained 28.6% solids.

The carbon black, the first portion of NMP, and the PVDF solution were first combined in a plastic vial and centrifugally mixed (ARE-310, Thinky USA, Inc., Laguna Hills, Calif.) two times, for 60 s at 2000 rpm each time. The cathode active powder and the $2^{nd}$ portion of NMP were added and the paste was centrifugally mixed two times (2×1 min at 2000 rpm). The vial was placed in an ice bath and the rotor-stator shaft of a homogenizer (model PT 10-35 GT, 7.5 mm diameter stator, Kinematicia, Bohemia, N.Y.) was inserted into the vial. The gap between the vial top and the stator was wrapped with aluminum foil to minimize water ingress into the vial. The resulting paste was homogenized for two times for 15 min each at 6500 rpm and then twice more for 15 min at 9500 rpm. Between each of the four homogenization periods, the homogenizer was moved to another position in the paste vial.

The paste was cast using doctor blades with a 0.41-0.51 mm gate height onto aluminum foil (25 μm thick, 1145-0, Allfoils, Brooklyn Heights, Ohio) using an automatic coater (AFA-II, MTI Corp., Richmond, Calif.). The electrodes were dried for 30 min at 95° C. in a mechanical convection oven (model FDL-115, Binder Inc., Great River, N.Y.). The resulting 51-mm wide cathodes were placed between 125 μm thick brass sheets and passed through a calender three times using 100 mm diameter steel rolls at ambient temperature with nip forces increasing in each of the passes, starting at 260 kg with the final pass at 770 kg. Loadings of cathode active material were 9 to 12 mg/cm$^2$.

Anode Preparation

The following is a typical procedure used to prepare anodes. An anode paste was prepared from the following materials: 5.00 g graphite (CPreme® G5, Conoco-Philips, Huston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials were combined in a ratio of 88:0.17:7:4.83, graphite:oxalic acid: PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 μm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 μm thick brass sheets and passed through a calender three times using 100 mm diameter steel rolls at ambient temperature with nip forces increasing in each of the passes, starting at 260 kg with the final pass at 770 kg.

Coin Cells

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Nonaqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a polyimide nanofiber (Energain®, E.I. du Pont de Nemours and Company, Wilmington, DE). The nonaqueous electrolytes used in the preparation of the coin cells are described in the following Examples.

Examples 1-2 and Comparative Examples 1-4

High Temperature Performance of Coin Cells

The coin cells were cycled twice for formation using a commercial battery tester (Series 4000, Maccor, Tulsa, Okla.) at ambient temperature using constant current charging and discharging between voltage limits of 3.4-4.9 V at a current of 12 mA per gram of cathode active material, which is approximately a 0.1 C rate. The coin cells were placed in an oven at 55° C. and cycled using constant current charging and discharging between voltage limits of 3.4-4.9 V at a current of 240 mA per gram of cathode active material, which is approximately a 2 C rate.

The results are summarized in the Table, which provides the solvents and additives used; the coulombic efficiency (CE) measured in the first cycle of formation, where CE= (discharge capacity)/(charge capacity); the discharge capacity in the first cycle at 55° C. per gram of cathode active material; the CE in the 10th cycle; and the cycle life at 55° C. (which is the number of cycles completed at 55° C.). The column labelled "N" indicates the number of cells for each Example or Comparative Example for which data was averaged to provide the numerical values in the corresponding row. The to cycle life was measured as the number of cycles required to reduce the discharge capacity to 80% of the capacity measured in the 2nd cycle of cycling at 55° C.

In Example 1, the electrolyte was a mixture of 25.0 wt % ethylene carbonate (EC), 60.5 wt % 2,2-difluoroethyl acetate (DFEA), 1,0% maleic anhydride (MA), 1.0% fluoroethylene carbonate (FEC), 1.0% TEP (triethyl phosphate, obained from Sigma-Aldrich and distilled), and 11.5 wt % LiPF$_6$.

In Example 2, the electrolyte was a mixture of 25.0 wt % EC, 60.5% EMC, 1.0% MA, 1.0% FEC, 1.0% TEP, and 11.5% LiPF$_6$.

In Comparative Example 1, the electrolyte was a mixture of 26.5 wt % EC, 62.0% EMC, and 11.5 wt % LiPF$_6$.

In Comparative Example 2, the electrolyte was a mixture of 26.5 wt % EC, 62.0% DFEA, and 11.5 wt % LiPF$_6$.

In Comparative Example 3, the electrolyte was a mixture of 26.0 wt % EC, 61.5% EMC, 1.0% TEP, and 11.5 wt % LiPF6.

In Comparative Example 4, the electrolyte was a mixture of 26.0 wt % EC, 61.5% DFEA, 1.0% TEP, and 11.5 wt % LiPF$_6$.

The results shown in the Table demonstrate that the electrolytes containing a cyclic carboxylic acid anhydride (i.e., MA), a cyclic carbonate (i.e. fluoroethylene carbonate) and a trialkylphosphate (i.e. triethylphosphate), as disclosed herein (Examples 1 and 2) gave a significantly longer cycle life, and comparable or better discharge capacity and first and tenth cycle coulombic efficiency than the electrolyte either containing no additional additives (Comparative Examples 1 and 2) or a trialkylphosphate additive alone (Comparative Examples 3 and 4).

TABLE

| | | | | High Temperature Performance of Coin Cells | | | |
|---|---|---|---|---|---|---|---|
| Example | Solvents | Additive(s) | CE 1st Cycle Formation (%) | Discharge Capacity 1st cycle 55° C. (mAh/g) | CE 10th Cycle (%) | Cycle Life 55° C. (cycles) | N |
| 1 | EC/DFEA | 1% MA + 1% FEC + 1% TEP | 79.37 | 113 | 98.88 | 81 | 2 |
| 2 | EC/EMC | 1% MA + 1% FEC + 1% TEP | 77.02 | 111 | 98.18 | 103 | 3 |
| Comp. Ex. 1 | EC/DFEA | none | 65.30 | 104 | 95.67 | 16 | 3 |
| Comp. Ex. 2 | EC/EMC | none | 78.90 | 115 | 98.52 | 51 | 3 |
| Comp. Ex. 3 | EC/DFEA | 1% TEP | 60.93 | 99 | 95.03 | 12 | 3 |
| Comp. Ex. 4 | EC/EMC | 1% TEP | 77.40 | 107 | 98.04 | 51 | 3 |

What is claimed is:

1. An electrolyte composition, comprising:
    a) from about 10% to about 80% by weight of the electrolyte composition of at least one non-fluorinated solvent selected from the group consisting of ethyl methyl carbonate, dimethyl carbonate, diethyl carbonate, propylene carbonate, and mixtures thereof;
    b) from about 10% to about 50% by weight of the electrolyte composition of a co-solvent comprising ethylene carbonate;
    c) from about 0.1% to about 10% by weight of the electrolyte composition of an additive comprising at least one cyclic carboxylic acid anhydride selected from the group consisting of maleic anhydride, 2,3-dimethylmaleic anhydride, and citraconic anhydride;
    d) from about 0.2% to about 10% by weight of the electrolyte composition of at least one phosphorus-containing additive selected from the group consisting of triethyl phosphate, trimethyl phosphate, tripropyl phosphate, and triisopropyl phosphate;
    e) at least one electrolyte salt; and
    f) from about 0.01% to about 10% by weight of the electrolyte composition of an additive comprising fluoroethylene carbonate.

2. The electrolyte composition of claim 1, wherein the cyclic carboxylic acid anhydride is maleic anhydride.

3. The electrolyte composition of claim 1 further comprising lithium bis(oxalato)borate, wherein a total amount of the additive comprising fluoroethylene carbonate and lithium bis(oxalato)borate is from about 0.01% to about 10% by weight.

4. An electrochemical cell comprising:
    (a) a housing;
    (b) an anode and a cathode disposed in said housing and in ionically conductive contact with one another;
    (c) the electrolyte composition of claim 1 disposed in said housing and providing an ionically conductive pathway between said anode and said cathode; and
    (d) a porous separator between said anode and said cathode.

5. The electrochemical cell of claim 4, wherein said electrochemical cell is a lithium ion battery.

6. The electrochemical cell of claim 5, wherein the anode is lithium titanate or graphite.

7. The electrochemical cell of claim 5, wherein the cathode comprises a cathode active material exhibiting greater than 30 mAh/g capacity in the potential range greater than 4.6 V and up to 4.9 V versus a Li/Li$^+$ reference electrode.

8. The electrochemical cell of claim 5, wherein the cathode comprises a cathode active material which is charged to a potential greater than or equal to 4.35 V and up to 4.9 V versus a Li/Li$^+$ reference electrode.

9. The electrochemical cell of claim 5, wherein the cathode comprises a lithium-containing manganese composite oxide having a spinel structure as active material, the lithium-containing manganese composite oxide being represented by the formula:

$$Li_xNi_yM_zMn_{2-y-z}O_{4-d},$$

wherein x is 0.03 to 1.0; x changes in accordance with release and uptake of lithium ions and electrons during charge and discharge; y is 0.3 to 0.6; M is selected from the group consisting of Cr, Fe, Co, Li, Al, Ga, Nb, Mo, Ti, Zr, Mg, Zn, V, and Cu; z is 0.01 to 0.18, and d is 0 to 0.3.

10. The electrochemical cell of claim 9, wherein y is 0.38 to 0.48, z is 0.03 to 0.12, and d is 0 to 0.1.

11. The electrochemical cell of claim 9, wherein M is selected from the group consisting of Li, Cr, Fe, Co, and Ga.

12. An electronic device comprising the electrochemical cell according to claim 4.

* * * * *

UNITED STATES PATENT AND TRADEMARK OFFICE
CERTIFICATE OF CORRECTION

| | |
|---|---|
| PATENT NO. | : 11,362,368 B2 |
| APPLICATION NO. | : 16/118034 |
| DATED | : June 14, 2022 |
| INVENTOR(S) | : Charles J. Dubois et al. |

It is certified that error appears in the above-identified patent and that said Letters Patent is hereby corrected as shown below:

In the Claims

In Claim 9, Column 18, Line 40, the formula "$Li_xNi_yM_zMn_{2-yz}O_{4-d}$" should read -- $Li_xNi_yM_zMn_{2-y-z}O_{4-d}$ --.

Signed and Sealed this
Eleventh Day of October, 2022

Katherine Kelly Vidal
*Director of the United States Patent and Trademark Office*